ns Patent [19]

United States Patent [19]

Trippe et al.

[11] Patent Number: 4,788,643
[45] Date of Patent: Nov. 29, 1988

[54] CRUISE INFORMATION AND BOOKING DATA PROCESSING SYSTEM

[76] Inventors: Kenneth A. B. Trippe; Peter M. Edgar, both of P.O Box 5915, Ponce De Leon Blvd., Suite 16, Coral Gables, Fla. 33146; David Vollrath, 3085 Aviation Ave., Miami, Fla. 33133

[21] Appl. No.: 769,690

[22] Filed: Aug. 27, 1985
(Under 37 CFR 1.47)

Related U.S. Application Data

[63] Continuation-in-part of Ser. No. 527,408, Aug. 29, 1983, abandoned.

[51] Int. Cl.$^4$ ............................................. G06F 15/22
[52] U.S. Cl. .................................... 364/407; 364/100
[58] Field of Search ........ 364/407, 707, 200 MS File, 364/900 MS File

[56] References Cited

U.S. PATENT DOCUMENTS 4,186,438  1/1980  Benson et al. ...................... 364/200
4,630,196 12/1986  Bednar et al. ...................... 364/200

OTHER PUBLICATIONS

Mars Plus TM Operators Manual (Except) Aug. 1980.
G. D. Dubey et al, "Data Communications Network for Air-India and Indian Airline, *J. Inst. Electronics & Telecom. Engrs.*, Mar.-Apr. 1984.

Primary Examiner—Jerry Smith
Assistant Examiner—Charles B. Meyer
Attorney, Agent, or Firm—Lane and Aitken

[57] ABSTRACT

In a travel reservation and information data processing system, airline reservation computers, which are connected to remotely located data processing terminals in travel agents's offices, are also connected to a separate computer having a database containing detailed information on available cruises offered by subscribing cruise line operators. The separate computer is connected to remotely located data processing terminals in the offices of the subscribing cruise lines. The programs of the airline reservation computers are provided facilities to recognize requests for cruise information or cruise bookings received from the travel agents' terminals and to relay these requests to the separate computer. The separate computer responds to the received requests by transmitting back the requested information to the airline reservation computer from which the request was received or by entering a dialog to obtain information from the travel agent's terminal needed to make a booking. The airline reservation computer sends messages and information back to the travel agent's terminal from which the original request was received, and at which the information or message is then displayed. The data processing terminals in the cruise line operators offices are used to update the information in the database of the separate computer on the available cruises. When the separate computer has received the information needed for a booking it builds a booking message containing the information and transmits the booking message to the terminal in the office of the cruise line being booked. The cruise line then uses this terminal to confirm the booking to the separate computer.

7 Claims, 3 Drawing Sheets

CRUISE INFORMATION AND BOOKING DATA PROCESSING SYSTEM

CROSS REFERENCE TO RELATED APPLICATIONS

This application is a continuation-in-part of application Ser. No. 527,408 filed Aug. 29, 1983, invented by the inventors of this application, and now abandoned.

BACKGROUND OF THE INVENTION

This invention relates to travel information data processing systems and more particularly to such a system employing cooperating interconnecting computers which handle information and booking on different kinds of travel reservations.

At the present time, several of the major airlines each have in operation an airline reservation computer which is operable to furnish information concerning and to book reservations on commercial airline flights in response to received requests. The airline reservation computers are connected to remotely located data processing terminals in travel agents offices. From these terminals the travel agents may obtain information on flight schedules, fares and reservation availability from the data base in the airline reservation computers and may book airline reservations.

The present invention makes use of this existing system to provide information and booking services on the different kinds of travel accommodations and more specifically on cruises.

SUMMARY OF THE INVENTION

In accordance with the present invention a separate computer, called a cruise information computer, is connected to each of the airline reservation computers, and also is connected to remotely located terminals in the offices of subscribing cruise line operators. The cruise information computer is provided with a data base containing cruise information and booking availability on cruises offered by each of the subscribing cruise line operators. The travel agents by means of the terminals in their offices may enter cruise data requests in the form of requests for cruise information or for cruise bookings, which are transmitted to the corresponding airline reservation computers connected thereto. The airline reservation computers are each provided with a message relaying routine, which will recognize a cruise data request and relay the request to the cruise information computer. If the request is for cruise information, the cruise information computer will then respond to the cruise data request and transmit the requested cruise information back to the airline reservation computer, which will then relay cruise information to the terminal of the travel agent where the cruise information will be displayed.

A dialog of cruise data requests and responses to the requests between a travel agent's terminal and the cruise information computer transmitted via the airline reservation computer is initiated by the travel agent entering on his terminal a cruise log-on request. This request will be recognized by the airline reservation computer as a cruise data request and will relay the log-on request to the cruise information computer. In response to the log-on request the cruise information computer will transmit via the airline reservation computer to the travel agent's terminal a menu of possible cruise information requests. In the ensuing dialog the travel agent may obtain cruise information in a prompted access mode in which the travel agent is stepped to levels of data by making selections from successively presented menus. Alternatively, the travel agent may receive information in a direct access mode, in which the travel agent may make requests for specific cruise information. The information available from the data base of the cruise information computer either in the prompted access mode or in the direct access mode includes information as to available space on cruises organized by geographic areas and vessels. In addition the travel agent may request booking of a reservation on a cruise in the dialog. When a travel agent initiates a booking requests, the travel agent and the cruise information computer system stays in two way communication via the airline reservation computer, until the cruise information computer has obtained the information needed to book a cruise reservation. When the needed information has been received, the cruise information computer builds a booking message and transmits the booking message to a terminal at the cruise line on which the booking was requested. The cruise line uses the terminal to confirm the reservation to the cruise line computer by sending a confirmation message to the cruise line computer. Upon receipt of the confirmation message, the cruise line computer stores the message and decrements the inventory of available cabins of the type requested on the cruise being booked.

Each airline reservation computer to which the cruise information computer is connected, employs a different character coding technique. The cruise information computer includes a translator, which translates messages received from each airline reservation computer into the character code system employed in data processing equipment of the cruise information computer, and translates each message transmitted to an airline reservation computer, to be relayed to a travel agent, to the character code system of the airline reservation computer.

By providing the cruise information and booking services on a separate computer connected to the airline reservation computer, the cruise information is instantly provided to the travel agents on a very economical and convenient basis.

Further advantages and objects of the invention will become readily apparent as the following detailed description of the invention unfolds when taken in conjunction with the drawings.

DESCRIPTION OF PREFERRED EMBODIMENTS

Figure 1:
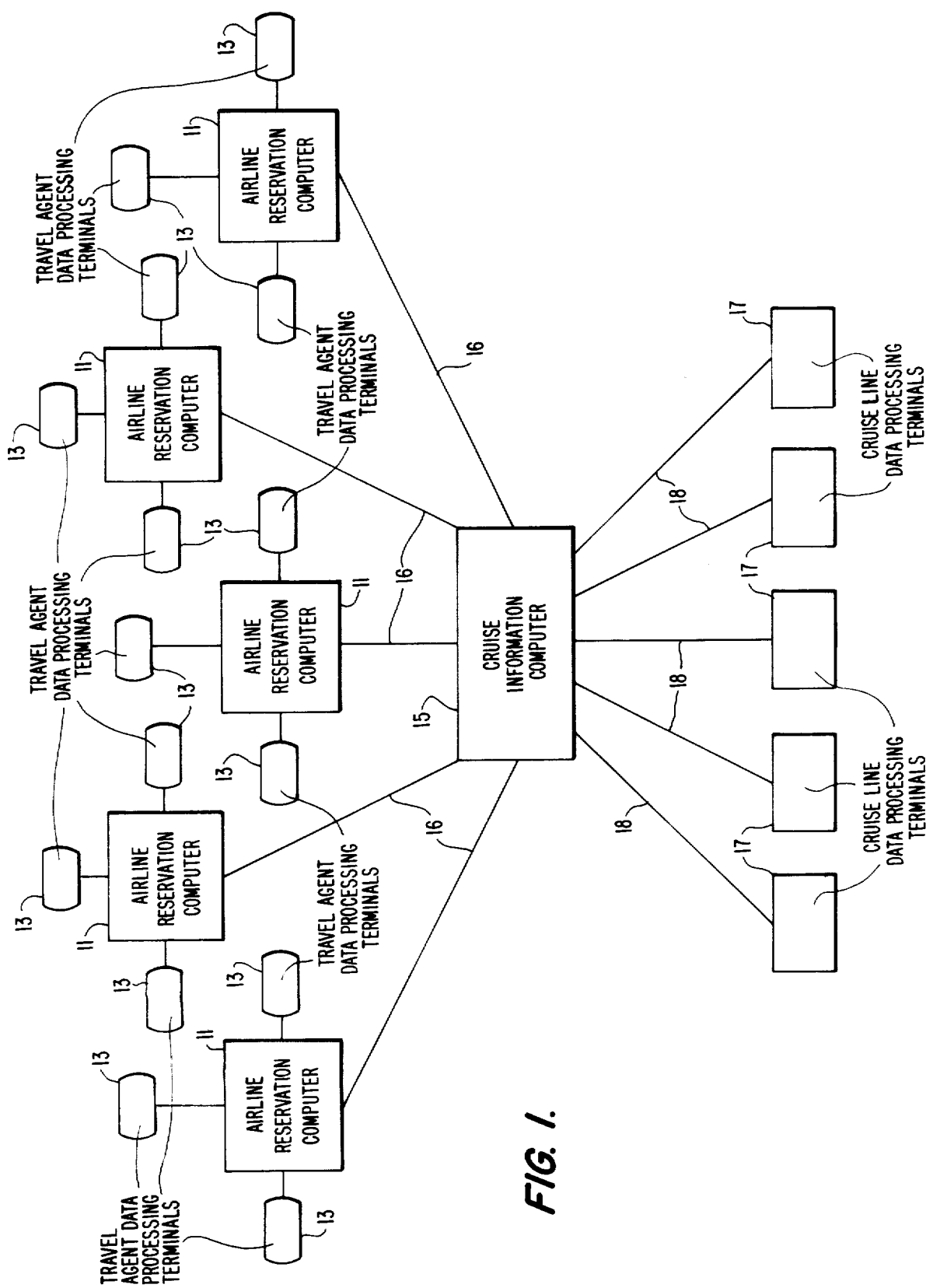
FIG. 1 is a block diagram of the system of the present invention.

As shown in FIG. 1, the travel information and booking system of the present invention comprises a plurality of airline reservation computers 11, each employed to keep track of airline reservations for one of the major airlines. There are several such reservation computers presently in use. Each airline reservation computer provides information on the availability of space on commercial airline flights in response to requests submitted from data terminals. Each of the airline reservation computers is connected over leased lines to remote terminals 13, located in travel agents offices and on these terminals the travel agents may directly access the airline reservation computer 11 to which the travel agent's terminal is connected and obtain information on the availability of space and book reservations on commercial airlines.

Each airline reservation computer maintains a count of unreserved seats in each class of service, and in response to a request for a reservation, books the reservation by decrementing the count of unsold seats and confirming the reservation by a message transmitted back to the travel agent's terminal from which the reservation request was received.

In accordance with the present invention, a cruise information computer 15, is connected to each of the airline reservation computers over dedicated lines 16 and is also connected over dedicated lines 18 to the plurality of remote data terminals 17, which are intelligent work stations, located in the office of each subscribing cruise line operator. The cruise information computer 15 includes a memory containing a data base which stores detailed information on the cruises offered by each of the subscribing cruise line operators and this data base is maintained current by data entered into the data base of the computer 15 provided by the cruise line operator, such as by means of the data terminals 17.

The airline reservation computers 11 are each provided with a message relaying facility for processing incoming messages, which facility will recognize cruise data requests entered on and received from the travel agent's terminals 13. The airline reservation computers recognize a cruise data request from a data word in the request identifying the request as a cruise data request and without accessing the data base in the memory of the airline computer. In response to the identifying word in a cruise data request received from a travel agent's terminal, an airline reservtion computer will relay the cruise data request to the cruise information computer 15. The cruise information computer 15 will then respond to the cruise data request. If the request is for cruise information, the cruise information computer 15 will transmit the requested information to airline reservation computer 11 which relayed the request. The airline reservation computer, in the message relaying routine, will relay this data to the terminal 13 which initiated the cruise data request, whereupon the terminal 13 will display the received cruise information.

In accordance with the invention, the travel agents may also book reservations on specific cruises by entering requests for bookings on the terminals 13. These requests for booking will be recognized as cruise data requests by the airline reservation computers 11 and transmitted to the computer 15.

In response to a request for booking, the cruise information computer 15 enters into a two way dialog with the travel agent terminal 13 via the corresponding airline reservation computer 11 to obtain the data necessary to book the cruise reservation. When the necessary information has been obtained, the computer 15 builds a booking message and transmits the booking message to the terminal 17 at the cruise line on which the cruise reservation is requested. The cruise line then uses the terminal 17 to send a confirmation message to the computer system 15, which in response to the confirmation messge decrements the inventory of the available cabins of the type requested on the cruise being booked. In this manner each cruise line maintains control over the booking of its cruises. In addition to updating the inventory of available cabins in response to receiving a confirmation message, the cruise information computer system 15 also stores the confirmation message in its data base. The confirmation message contains details about the booking including cost, payment schedule, identification of the cabins booked, in addition to indicating that the booking has been confirmed. The travel agent can then obtain this confirmation message by a subsequent cruise data request and thus, be informed that the cruise booking has been confirmed.

Figure 2:
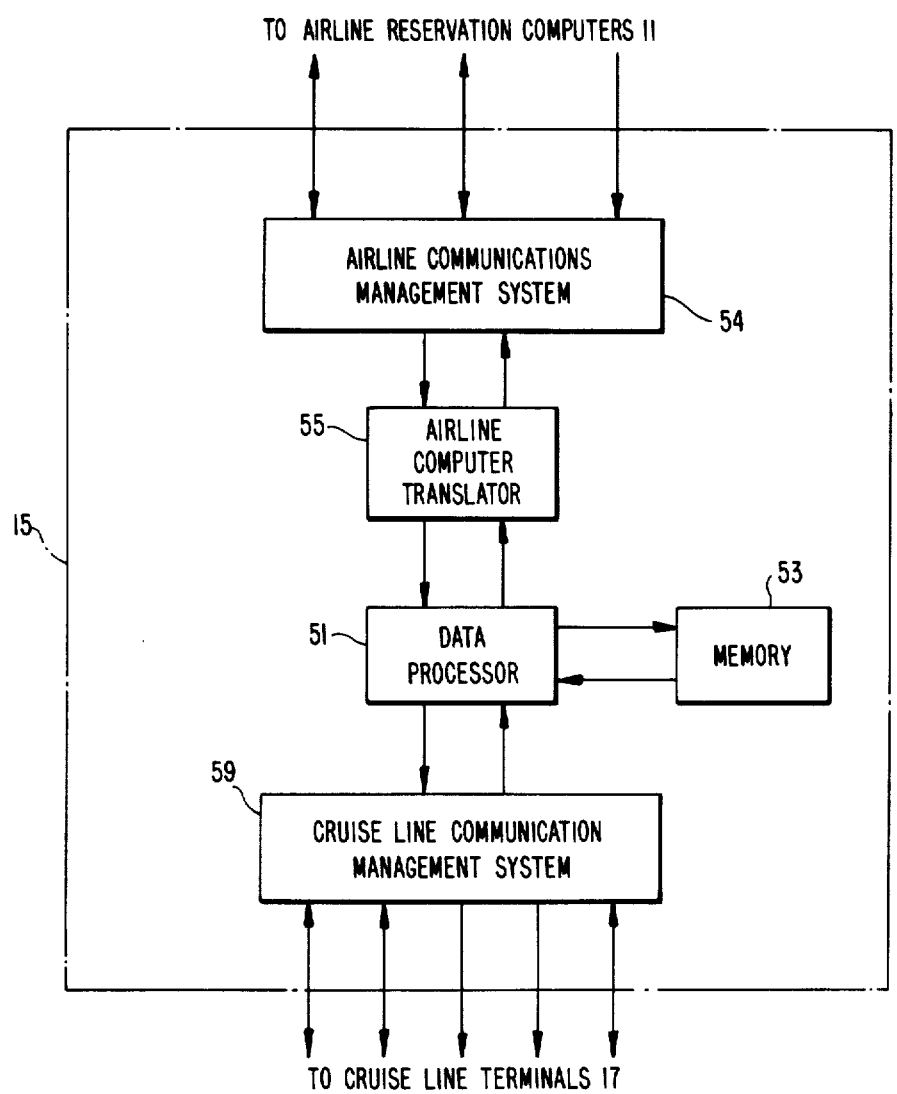
FIG. 2 is a block diagram of the cruise information computer shown in FIG. 1.

As shown in FIG. 2, the cruise information computer 15 comprises a data processor 51 connected with the computer memory 53, containing the cruise information data base. When a cruise data request is transmitted by an airline reservation computer to the cruise information computer 15, it is received by an airline communications management system 54, which onverts the received signals of the request into a form usable by the data processing equipment of the cruise information computer and applies the converted signals to an airline computer translator 55. The translator 55 translates the character code of the received signals from that of the airline reservation computer, which relayed the request, to the character code system of the data processor 51 and applies the translated code signals to the data processor 51. If the data request is a request for information, the data processor 51 locates the requested information in the memory 53 and assembles the information to be transmitted back to the travel agent's terminal 13 which requested the information. The assembled information is then applied to the translator 55 which translates the information into the character code system of the airline reservation computer to which the information is to be sent and applies the translated character code signals to the management system 55. The management system 55 converts the signals into a form to be transmitted over the dedicated lines 16 and then transmits the converted signals to the appropriate airline reservation computer over the interconnecting dedicated line.

If the cruise data request is a request for booking, the data processor 51 enters into a two way dialog with the travel agent to obtain the necessary information to book the cruise reservation. When the necessary information has been obtained, the processor 51 assembles the information into a booking message and transmits the booking message to a cruise line communications management system 59, which converts the message into a form to be transmitted over dedicated lines 18 and then transmits the booking message to the terminal 17 of the cruise line on which the booking is to be made. An operator at the terminal 17 will confirm the booking by transmitting a confirmation message to the communication management system 59, which converts to receive signals into a form usable by the data processor 51 and transmits the converted signals to the data processor 51. The data processor 51 then stores the received confirmation message, and also decrements the inventory of the available cabins of the type requested on the cruise being booked.

There is maintained in the database of the cruise information computer 15, a file for each subscribing cruise line operator, which file will include the names of the vessels on which cruises are offered by the cruise line operator and a master ship file for each vessel. The master ship file will contain the ports of embarkation of the vessel, the sailing dates for the vessel, a description of the itinerary for the vessel, price information for the vessel, and a detailed description of the vessel. A general list of ports of embarkation for all the subscribing cruise line operators is maintained separated by geographical areas, and a list of cruise lines serving each port of ambarkation. In addition the database contains in the file of each cruise line operator an inventory of available cabins on each cruise currently offered by the cruise line operator. A count or listing of the unsold cabins in each category of cabins on each deck of each cruise ship is maintained to comprise the inventory. The different categories of cabins on each cruise ship usually represents a different price to the customer.

Each cruise line operator is responsible to periodically update the file for that operator including the inventory of unsold cabins such as by means of data entered through terminal 17.

A travel agent who desires cruise information from the computer 15 or desires to make cruise booking by means of the computer 15, initiates a dialog with the computer 15 by entering a cruise log-on request. When a cruise log-on request is entered on one of the travel agent's terminals, it will be transmitted to the corresponding airline reservation computer, which will recognize the cruise log-on request and transmit it to the cruise information computer 15. Subsequent messages in the dialog between the computer 15 and the terminal 13 from which the dialog was initiated will be relayed by the airline reservation computer with minimal processing.

Figure 3:
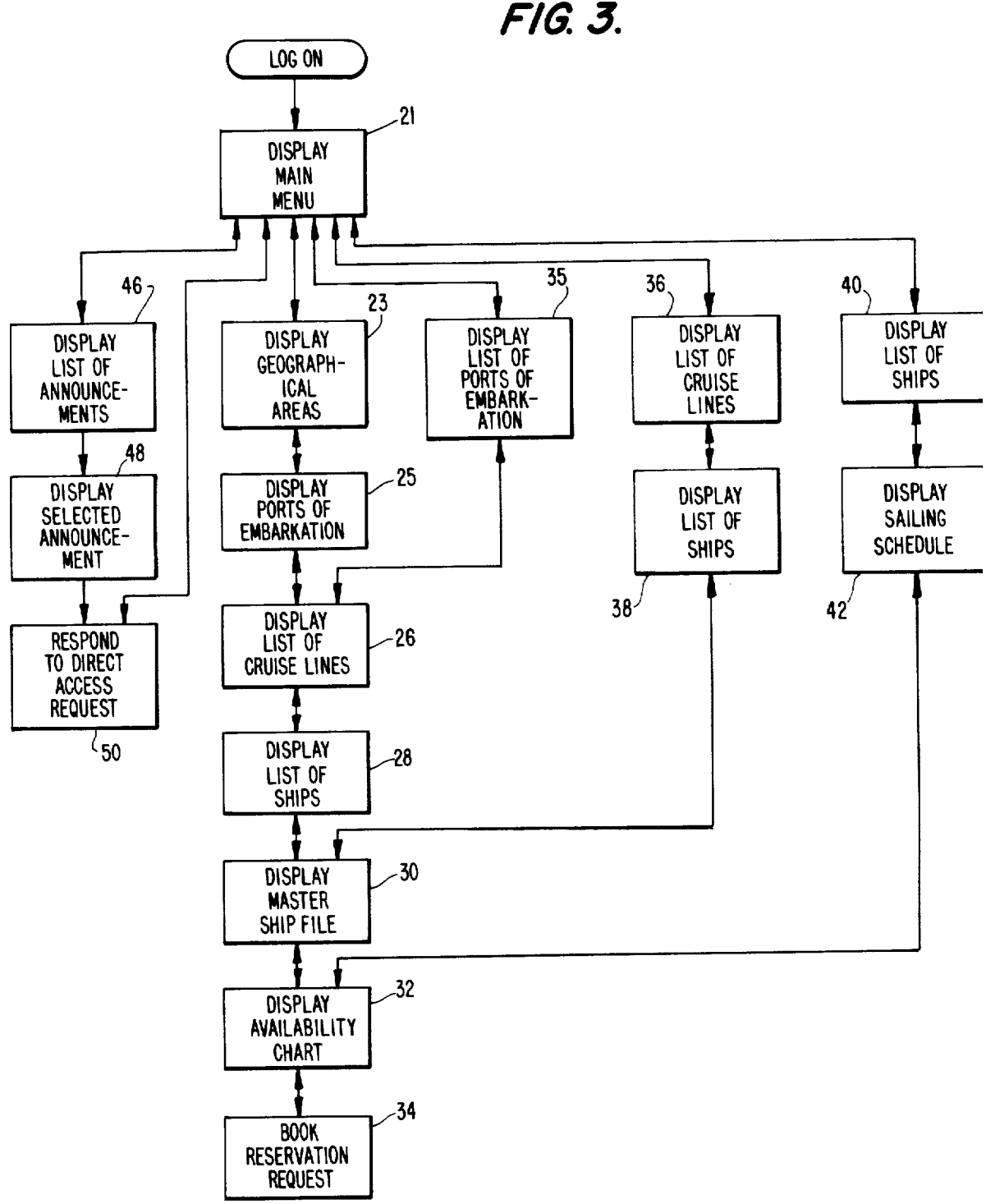
FIG. 3 is a flow chart of the program employed on a cruise information computer of the present invention.

The flow chart shown in FIG. 3 represents the program employed by the data processor 51 of the computer 51 to respond to cruise data requests received from a travel agent entered on a terminal 13. As explained above, the cruise data requests are entered on a terminal 13 and are relayed to the computer 15 by means of an airline reservation computer 11 and responses to the cruise data requests are transmitted back to the terminal from which the request originated via the airline reservation computer involved. In FIG. 3 many of the instruction sequences represented by the depicted blocks bear a legend indicating various cruise information data are displayed. It will be understood that in these instructions sequences the cruise information computer only collects, organizes, and then transmits the data to be displayed to one of the appropriate airline computers 11, which then relays it to the terminal 13 from which the request triggering the instruction sequence was received, and that the display of the data is at the terminal 13.

As shown in FIG. 3, in response to the computer 15 receiving a log-on request, the program of the computer 15 enters instruction sequence 20, which causes the headings of a list of cruise announcements to be displayed at the terminal 13. The cruise information computer 15, in addition to causing the list of the cruise announcements to be displayed in response to receiving a log-on request, also will allocate a secondary address for internal use and all activity for the ensuing dialog with the travel agent will be identified through this secondary address.

An example of the display of the list of cruise announcements is shown below:

LOG-ON COMPLETE 05-23-1983

CRUISENEWS

1. ROYAL CARIBBEAN ANNOUNCES SPECIAL CHRISTMAS HOLIDAY SCHEDULES
2. CARNIVAL TO PLACE TSS CARNIVAL IN 3 AND 4 DAY MARKET
3. NORWEGIAN CARIBBEAN
4. EASTERN CRUISE LINES TO ADD BAHAMA OUT ISLAND TO EMERALD SEA ITINERARY.

WHAT NEWS DO YOU WISH TO SEE?

FOR MAIN MENU DISPLAY ENTER MM

The travel agent is prompted in the display to select one of the announcements by entering the number associated with the heading in the display or to enter MM to see the main menu of choices to be entered to obtain detailed cruise information in a prompted access mode.

If the travel agent enters MM to select the main menu, the program will enter instruction sequence 21, which causes the main menu to be displayed at the terminal 13.

The main cruise information menu is repeated below:

GENERAL CATEGORIES

1. GEOGRAPHICAL AREAS
2. PORTS OF EMBARKATION
3. NAMES OF CRUISE LINES
4. NAMES OF VESSELS
5. PROMOTIONAL MATERIAL REQUEST
6. CRUISENEWS HEADLINES
ENTER CATEGORY NUMBER?

If the travel agent then wants to display a list of the geographical areas served by the subscribing cruise lines, he enters on his terminal the number 1. If he wants a list of ports of embarkation served by subscribing cruise line operators he enters the number 2 on the terminal. If he wants a list of the names of the cruise lines displayed, he enters the number 3, and if he wants a list of the names of the vessels of the subscribing cruise lines, he enters the number 4. Entry of the number 5 is to request promotional material ot be mailed to the travel agent and entry of the number 6 is to request a list of cruise line announcement headlines to be displayed. The Cruise line announcement headlines are identified in the display by the service mark CRUISENEWS.

If in response to the display of the main menu, the travel agent enters a "1" to select the geographical area display, the program enters instructions sequence 23 in which it causes the terminal 13 to display a list of geographical areas served by the subscribing cruise lines. This display is repeated below:

GEOGRAPHICAL AREAS

1. AFRICA/INDIAN OCEAN
2. ALASKA
3. AMAZON
4. ANTARTICA
5. BAHAMAS
6. BERMUDA
7. CANADA/NEW ENGLAND
8. CARIBBEAN
9. CHINA/ORIENT/PACIFIC
10. CRUISES TO NOWHERE
11. GREEK ISLES/MEDITERRANEAN
12. HAWAII
13. MEXICO

14. NORTH CAPE/FJORDS/RUSSIA
15. RIVERBOAT CRUISES cruise ship is displayed. An example of such a display is shown in the Table below:

| CTGY | DECK | CARIBBEAN/MIA/CCL/FESTIVALE/ 01/21/84 DESCRIPTION | HIGH | STATUS |
|------|------|----------------------------------------------------|------|--------|
| 0 12 | VERANDAH | VERANDAH SUITE 2 LOWER | 1595 | AVAL |
| 1 12 | EMPRESS | O.S. SINGLE | 1595 | AVAL |
| 2 11 | VERANDAH | DEMI SUITE | 1425 | AVAL |
| 3 10 | VERANDAH | O.S. DLX QUEEN | 1330 | RQST |
| 4 10 | VERANDAH | O.S. DLX 2 LOWER | 1330 | RQST |
| 5 10 | EMPRESS | I.S. SINGLE | 1330 | RQST |
| 6 9 | VRNDAH/EMPRESS | O.S. QUEEN | 1250 | AVAL |
| 7 9 | EMPRESS | O.S. 2 LOWER | 1250 | AVAL |
| 8 8 | UPPER | O.S. QUEEN | 1205 | AVAL |
| 9 8 | UPPER | O.S. 2 LOWER | 1205 | AVAL |
| 10 7 | MAIN | O.S. QUEEN | 1160 | AVAL |
| 11 7 | MAIN | O.S. 2 LOWER | 1160 | AVAL |
| 12 7 | VRNDAH/EMPRESS | I.S. QUEEN | 1160 | AVAL |
| 13 7 | VRNDAH/EMPRESS | I.S. 2 LOWER | 1160 | AVAL |
| 14 6 | RIVIERA | O.S. QUEEN | 1110 | RQST |
| 15 6 | RIVIERA | O.S. 2 LOWER | 1110 | RQST |
| HOW MANY CABINS? ENTER LINE NUMBER | | | | |

16. ROUND THE WORLD
17. SOUTH AMERICA
18. TRANSATLANTIC
19. TRANS-PANAMA CANAL
ENTER GEOGRAPHICAL AREA?

As prompted in the display, the travel agent may then select one of the geographical areas identified by number in the display and enter this number. When the travel agent has entered a number in response to the display produced in instruction sequence 23, the program will enter instruction sequence 25, in which the ports of embarkation of the subscribing cruise line operators in the selected geographical area will be displayed and the travel agent will be prompted to select a port of embarkation by entering the number associated with a port of embarkation in the displayed list. Upon entering the number of the selected port of embarkation, the program will enter instruction sequence 26, in which a list of the cruise lines operating from the selected port of embarkation will be displayed and also the ports of call which are visited by the ships operating from the selected port of embarkation will be displayed. The travel agent will be prompted in the display to select a specific cruise line by entering the number associated with the selected cruise line in the display. When the travel agent enters a number to select a cruise line, the program will enter instruction sequence 28, in which there will be displayed at the travel agent's terminal a list of the ships of the cruise line operating from the previously selected port of embarkation with a short synopsis of each ship itinerary. The travel agent will be prompted in the display to select one of the ships by entering the number associated with the ship in the display. Upon entering a number associated with a ship, the program will enter instruction sequence 30, in which the master file of the selected ship is displayed. The master file will contain information on sailing dates for the selected ship, a detailed description of the itinerary of the selected ship, price information on the selected ship and a detailed description of the vessel. In the display produced by instruction sequence 30, the travel agent is prompted to enter a sailing data to initiate an information availability request. If the travel agent enters a sailing date, the program enters instruction sequence 32 in which a chart indicating the availability of the cabins on the selected The top of the displayed chart in instruction sequence 32 will be a header indicating the previous selections made by the travel agent. In the example, the travel agent has initially selected a geographical area as Caribbean, selected the port of embarkation as MIA (representing Miami), selected the cruise line CLC (representing Carnival Cruise Lines), selected the cruise ship FESTIVALE, and selected a sailing date of Jan. 21, 1984.

The left hand column of the chart numbers the lines of the chart sequentially and it is used by the agent in the manner to make a booking in the manner explained below. Each numbered line represents one set of similar cabins. The second column from the left in the chart headed by "CTGY" indicates the category of the set of cabins in the line. The third column from the left identified by the heading "DECK" identifies the deck on which the set of cabins for that line is located. The fourth column from the left headed by "DESCRIPTION" lists a brief description of each set of cabins. The fifth column headed in the examples of the chart by the work "HIGH" gives the price of the cabin on the selected sailing date. The price of the cabin varies with the season. In the example, the selected sailing date of Jan. 21, 1984 is during the high cost season and accordingly, and the column is headed by "HIGH to indicate that fact. The final right hand column in the chart indicates the status for each set of cabins, either as "AVAL" or "RQST". "AVAL" stands for "available" and means that these cabins are available for booking. The letters "RQST" stand for "request" and indicate that this set of cabins is not available for booking at that time, because the set of cabins are already sold out or because the cruise line operator has reserved these cabins. The travel agent may nevertheless submit a request for booking of cabins having a request status, in which case the computer 15 would relay the request to the cruise line operator to confirm or deny the request.

At the bottom of the chart the questions "How many cabins?" and "Enter line number?" appear to promot the agent to enter the number of cabins he desires to book and to enter the line number to designate the set of cabins in which the bookings is to be made. If the travel agent enters a number of cabins and then enters the line number, the selections made will appear on the display opposite the two prompting questions and will initiate a booking request, which will cause the program to enter instruction sequence 34, whereupon the computer 15 will respond to the booking request by demanding from the travel agent the information of the passenger data record which includes data identifying the passenger(s) and setting forth specific information about the passenger(s) and data identifying the travel agent. The data processor 51 of the computer 15 will assemble this information into a booking message, which the computer 15 transmits to the terminal 17 at the cruise line on which the booking is being requested.

If in instruction sequence 21 the travel operator enters the number 2 to select the category of ports of embarkation, the program will enter intruction sequence 35, in which it will cause the list of ports of embarkation from which the subscribing cruise line operator offers cruises to be displayed at the terminal of the travel agent. The cruise line operator is prompted to select one of the listed ports by entering the number on the display associated with the selected port, whereupon the program will enter instruction sequence 26 and display the list of cruise lines operating from the selected port of embarkation as described above. The sequence of operation in the prompted access mode will then proceed through instruction sequences 28, 30, 32 and 34 in the same manner as described above.

If in instruction sequence 21 the travel agent enters the number 3, the program will enter instructions sequence 36, in which the list of the subscribing cruise line operators will be displayed and the travel agent will be prompted to select one of the listed cruise lines by entering the number associated in the display with the cruise line he selects. Upon entering a number to select a cruise line, the program will advance into instruction sequence 38, in which a list of the cruise ships operated by the selected cruise line are displayed and the travel agent is prompted to select one of the listed ships by entering the number associated in the display with the ship that he selects. Upon entering a number to select a ship, the program advances to instruction sequence 30 to display the master ship file at the travel agents terminal and the program will then proceed in a prompted access mode through instruction sequences 32 and 34 as described above.

If in instruction sequence 21 the travel agent enters the number 4 to select the category, names of vessels, the program will proceed into instruction sequence 40, in which a list of all the cruise ships operated by all the subscribing cruise line operators will be displayed at the travel agents terminal and the travel agent will be prompted to select one of the vessels listed in the display. Upon entering a number to select a vessel, the program will advance to instruction sequence 42 in which the sailing schedule of the selected vessel will be displayed. An example of the display of a sailing schedule for a cruise ship is shown below:

| AREA = CARIBBEAN/EMB = MIA/ LINE = CCL/SHIP = FESTIVALE | | | | |
|---|---|---|---|---|
| SAILING SCHEDULE | | | MID | |
| MONTH | YEAR | HIGH DATES | DATES | LOW DATES |
| 0 JAN | 83 | | 15 22 29 | |
| 1 FEB | 83 | 5 12 19 26 | | |
| 2 MAR | 83 | 5 12 19 26 | | |
| 3 APR | 83 | | | 2 9 16 23 30 |
| 4 MAY | 83 | | | 7 14 21 28 14 21 |

| AREA = CARIBBEAN/EMB = MIA/ LINE = CCL/SHIP = FESTIVALE | | | | |
|---|---|---|---|---|
| SAILING SCHEDULE | | | MID | |
| MONTH | YEAR | HIGH DATES | DATES | LOW DATES |
| 5 JUN | 83 | | | 4 11 18 25 |
| 6 JUL | 83 | 2 9 16 23 30 | | |
| 7 AUG | 83 | | | 6 13 20 27 |
| 8 SEP | 83 | | | 24 |
| 9 OCT | 83 | | | 1 8 15 22 29 |
| 10 NOV | 83 | | | 5 12 19 26 |
| 11 DEC | 83 | 24 | 31 | 3 10 17 |
| 12 JAN | 84 | 14 21 28 | 7 | |
| DO YOU WANT TO BOOK (Y/N) | | | | |
| ENTER LINE NUMBER DAY ___ ___ ___ ___ | | | | |

As indicated in the header for this display, the display is for the cruise ship Festivale, which operates in the Caribbean, embarks from the port of Miami, and is operated by the cruise line designated CCL. The first column in the sailing schedule is a list of the next 13 months numbered 0–12. The next column indicates the departure dates for high season, mid-season and low season, respectively. The travel agent is queried with the question in the display "Do you want to book?" If he enters the letter "N" to indicate negative, the program returns to instruction sequence 40 to display the list of vessels again. If he enters "Y" the travel agent is prompted to enter a line number to select a month and then to enter a departure date Upon entering a departure date the program will advance to instruction sequence 32 and then into instruction sequence 34 in a prompted access mode as described above.

If, in the instruction sequence 21 the travel agent enters the number 5 so as to initiate a promotional material request, the program will enter instructions sequence 44 and display the table below:

Promotional Material Request

AREA—?
LINE—?
DATE—?
AGENCY NAME—?
YOUR ADDRESS—?
SUITE—?
CITY—?
STATE—?
ZIP—?

As indicated in this table, the travel agent is prompted to enter the geographical area he is interested in, the cruise line from which he wants the promotional material, the identification of his travel agency, and the address thereof. Upon completing the entries, the information entered by the travel agent in the request is automatically routed by the computer 15 to the terminal 17 of the cruise line operator identified in the request, where the promotional material request is printed out. In response to the promotional material request, the cruise line operator may then mail the requested promotional material to the travel agent.

If in instruction sequence 21, the travel agent enters the number 6 to select a general category of cruise announcements, identified by the service mark CRUISENEWS in the display produced as the travel agents terminal, the program will return to instruction sequence 20, in which the data processor 15 will cause the travel agents terminal to again display the headings of the list of cruise announcements.

If in instruction sequence 20, the travel agent enters a number to select one of the displayed cruise announcement headings, the program will enter instruction sequence 48 and display the announcement in full. Each cruise line operator is allocated a portion of the memory of the 15 to store an announcement of a fixed maximum length and the cruise line operator may insert his announcement into the assigned storage location by means of his terminal 17 . Each announcement may appear for a maximum of 14 days and a minimum of one day. After an announcement has been retained in storage for a time limit of 14 days, the data in the storage location assigned to that operator for announcements is automatically removed and will not appear in the displays produced in instruction sequences 46 and 48.

In each of the instruction sequences numbered in the range from 21 to 48 the travel agent may step back to the preceeding display by entering an appropriate code. In addition in each of these instruction sequences, with the exception of the instruction sequences 48 and 34, the travel agent may terminate the dialog by entering a log-off code. The log-off code may also be entered by the travel agent in instruction sequence 20. When the log-off code is entered, the cruise information computer 15 terminates the dialog by removing the allocated secondary address for the dialog from its operating parameters. After a travel agent has entered the log-off code, to get additional cruise information from the data processor 15, the travel agent must again enter his log-on code to start a new dialog.

In addition to the prompted mode of access, the travel agent from any of the instruction sequences of FIG. 3 may directly access the cruise information in the data base of the computer 15 by making appropriate entries on his terminal. An example of the entires for such a direct access request would be: ACCL/FESTIVALE12NOV83. In response to a direct access request the program will enter an instruction sequence to respond to the request and provide the information requested in the direct access request. THe response to the above direct access request example would be a display of the specific availability for the Festivale for the November 12 sailing.

From the above description it will be apparent that a mass of cruise information as well as convenient booking services is made instantly available to the travel agents by the system of the present invention. This information and booking service can be provided at a reasonable cost because the system makes use of the existing airline reservation computers to provide communication between the computers containing the cruise information data base and the travel agents.

What is claimed is:

1. A passenger travel reservation and information system comprising an airline reservation computer having data storage means storing data on the availability of a passenger space on a plurality of airline flights, a plurality of terminals connected to said airline reservation computer, each of said terminals having means to enter flight reservation requests, and transmit each entered flight reservation request to said airline reservation computer, each flight reservation request specifying at least one of said flights, said airline reservation computer having means responsive to the receipt of a flight reservation request to book the reservation requested by the flight reservation request by reducing the indicated space available in the data storage means of said airline reservation computer on the flight specified in the flight reservation request, a cruise information computer connected to said airline reservation computer and having data storage means storing information on availability of passenger space on a plurality of cruises, each of said terminals having means to enter cruise information requests containing requests for information on available cruises and to transmit each entered cruise information request to said airline reservation computer, said cruise information requests containing a predetermined identifying data word, said airline reservation computer having means responsive to said predetermined identifying word in a received cruise information request from one of said terminals to transmit the cruise information request to said cruise information computer, said cruise information computer having means responsive to the receipt of a cruise information request from said airline reservation computer to locate information in the data storage means of said cruise information computer corresponding to the information requested in said cruise information request and to transmit the located cruise information to said airline reservation computer, said airline reservation computer having means responsive to the receipt of cruise information from said cruise information computer to transmit the received cruise information to the terminal which transmitted the cruise information request which resulted in the cruise information being transmitted to said airline reservation computer, each of said terminals having means to display cruise information transmitted thereto by said airline reservation computer.

2. A travel reservation and information system as recited in claim 1, wherein said data storage means of said cruise information computer includes a file of stored information for each of a plurality of cruise line operators, said cruise information computer being connected to a second set of terminals, one for each of said cruise line operators, each of said terminals comprising means to update the information in the file in the data storage means of said cruise information computer for the corresponding cruise line operator.

3. A travel reservation and information system as recited in claim 2, wherein said cruise information computer maintains in said data storage, a record of unsold cabins for each available cruise from subscribing cruise line operators, each of said terminals has means to enter a cruise reservation request and to transmit each entered cruise reservation request to said airline reservation computer, said airline reservation computer having means responsive to the receipt of a cruise reservation request from one of said terminals to transmit the cruise reservation request to said cruise information computer, said cruise information computer having means responsive the receipt of a cruise reservation request from said airline reservation computer to enter a dialog with the terminal on which the cruise reservation request was entered to obtain booking data needed to book a cruise reservation, said cruise information computer transmitting a booking message containing said booking data to the terminal at the cruise line on which the cruise is being booked on the completion of said dialog.

4. A travel reservation and information system comprising a plurality of airline reservation computers each having data storage data means, storing data on the availability of passenger space on a plurality of airline flights, a plurality of terminals connected to each of said airline reservation computers, each of said terminals having means to enter flight reservation requests, and transmit each entered flight reservation request to the airline reservation computer connected thereto, each flight reservation request specifying one of said flights, said airline reservation computers each having means responsive to flight reservation requests received by such airline reservation computer to book the reservation requested by the flight reservation request by reducing the indicated space available in the data storage means of such airline reservation computer on the flight specified in the flight reservation request, a cruise information computer connected to each of said airline reservation computers and having data storage means storing information on availability of passenger space on a plurality of cruises, each of said terminals having means to enter cruise information requests containing requests for information on available cruises and to transmit each entered cruise information request to the airline reservation computer to which such terminals is connected, said cruise information requests each containing a predetermined identifying data word, said airline reservation computers each having means responsive to said predetermined identifying data in a received cruise information request from one of said terminals to transmit the cruise information request to said cruise information computer, said cruise information computer having means responsive to the receipt of a cruise information request from one of said airline reservation computers to locate information in the data storage means of said cruise information computer corresponding to the information requested in the received cruise information request and transmit the located cruise information to the airline reservation computer from which the cruise information request was received, each airline reservation computer having means responsive to the receipt of cruise information from said cruise information computer to transmit the received cruise information to the terminal which transmitted the cruise information request which resulted in the cruise information being transmitted to such airline reservation computer, each of said terminals having means to display cruise information transmitted thereto by the airline reservation computer connected thereto.

5. A travel reservation and information system as recited in claim 4, wherein each of said airline reservation computers employs a different character code system, means in said cruise information computer to translate each cruise information request received from an airline reservation computer into a common character code system employed in said cruise information computer, and to translate cruise information located in the data storage means of said cruise information computer in response to the receipt of a cruise information request into the character codey system of the airline reservation computer to which the cruise information is transmitted prior to the transmission of the information to such airline reservation computer.

6. A passenger travel reservation and information system comprising a first computer having data storage means for storing an inventory of available travel reservations of a first type of accomodation, a plurality of terminals connected to said first computer, each of said terminals having means to enter a first type of request for travel reservations of said first type of accomodation and transmit each such request to said first computer, said first computer having means responsive to the receipt of said first type of request to book the reservation requested by reducing the inventory of travel reservations stored in said data storage means, a second computer connected to said first computer and having storage means storing information on the availability of travel reservations of a second type of accomodation different than said first type of accomodation, each of said terminals having means to enter a second type of request for information on the availability of travel reservations of said second type and to transmit each such request to said first computer, said second type of request each containing a predetermined identifying data word, said first computer having means responsive to said predetermined identifying word in a request for said second type received from one of said terminals to transmit such request to said second computer, said second computer having means responsive to the receipt of a request of said second type from said first computer to locate information in the data storage means of said second computer, corresponding to the information requested in the second type of request and to transmit the located information to said first computer, said first computer having means responsive to the receipt of information from said second computer to transmit the received information to the terminal which transmitted the second type of request which resulted in the information being transmitted to said first computer, each of said terminals having means to display information transmitted thereto by said first computer.

7. A passenger travel reservation and information system as recited n claim 6, wherein said first type of accomodation is an airline passenger travel reservation, and said second type of accomodation is other than an airline passenger travel reservation.

* * * * *